United States Patent
Tsukagoshi et al.

(10) Patent No.: US 7,672,210 B2
(45) Date of Patent: Mar. 2, 2010

(54) HOLOGRAPHIC RECORDING MEDIUM, METHOD FOR RECORDING AND REPRODUCING THE SAME, AND REPRODUCING APPARATUS

(75) Inventors: Takuya Tsukagoshi, Sagamihara (JP); Tetsuro Mizushima, Moriguchi (JP); Jiro Yoshinari, Tokyo (JP); Hideaki Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 747 days.

(21) Appl. No.: 11/587,042

(22) PCT Filed: Apr. 1, 2005

(86) PCT No.: PCT/JP2005/006509

§ 371 (c)(1),
(2), (4) Date: Oct. 20, 2006

(87) PCT Pub. No.: WO2005/109113

PCT Pub. Date: Nov. 17, 2005

(65) Prior Publication Data
US 2007/0206448 A1 Sep. 6, 2007

(30) Foreign Application Priority Data
May 10, 2004 (JP) .............................. 2004-139479

(51) Int. Cl.
*G11B 7/00* (2006.01)
(52) U.S. Cl. .......................................... 369/103; 359/3
(58) Field of Classification Search ........................ None
See application file for complete search history.

(56) References Cited

U.S. PATENT DOCUMENTS

| 6,124,076 | A | 9/2000 | Dhar et al. |
| 6,348,983 | B1 | 2/2002 | Curtis et al. |
| 6,650,447 | B2 * | 11/2003 | Curtis et al. .................... 359/3 |
| 7,502,151 | B2 * | 3/2009 | Toishi et al. .................... 359/3 |

FOREIGN PATENT DOCUMENTS

| JP | A 10-97170 | 4/1998 |
| JP | A 2000-86914 | 3/2000 |
| JP | A 2002-32001 | 1/2002 |

OTHER PUBLICATIONS

Waldman et al., "Volume Shrinkage in Slant Fringe Gratings of a Cationic Ring-Opening Holographic Recording Material," Journal of Imaging Science and Technology, vol. 41, No. 5, 1997, pp. 497-514.

* cited by examiner

*Primary Examiner*—Joseph H Feild
*Assistant Examiner*—Joseph Haley
(74) *Attorney, Agent, or Firm*—Oliff & Berridge, PLC (57) ABSTRACT

A holographic recording medium 10 is configured to have a recording layer 12 on which information can be recorded as holograms; and first and second heat generating layers 14A and 14B provided in a pair so as to sandwich the recording layer 12. Then, the first and second heat generating layers 14A and 14B are allowed to generate heat by being irradiated with a heat generating laser beam LB3 having a wavelength that is different from that of a signal beam LB1 or a reference beam LB2 for reproducing or recording information. The holographic recording medium and a method for recording and reproducing the same, and a recording and reproducing apparatus can compensate for shrinkage of the recording layer due to recording or variations in temperature, thereby allowing for reproduction of the holograms under optimum conditions.

20 Claims, 6 Drawing Sheets

HOLOGRAPHIC RECORDING MEDIUM, METHOD FOR RECORDING AND REPRODUCING THE SAME, AND REPRODUCING APPARATUS

TECHNICAL FIELD

The present invention relates to a holographic recording medium, a method for recoding and reproducing the same, and a recording and reproducing apparatus.

BACKGROUND ART

Conventionally hologram recoding media including a recording layer on which information can be recorded as holograms are well-known, and the recording layer is typically formed of photopolymer or the like.

However, since the recording material such as photopolymer is likely to thermally deform, there is a problem that the recording layer is deformed (shrunk) when irradiated with a laser beam or exposed for fixation during recording or due to variations in temperature of storage places, resulting in variations in its reproduction properties such as diffraction efficiency.

As one of the means for solving such problems, a method for reducing shrinkage of a recording material has been suggested, e.g., as described in D. A. Waldman, "Journal of Imaging Science and Technology," 1997, vol. 41, no. 5, p. 497-514.

However, such a method did not succeed in completely eliminating the deformation of a recording material. Thus, there was still a problem that the deformation of the recording layer lead to different shapes of a hologram during recording and during reproducing, resulting in variations in the reproduction properties such as diffraction efficiency.

DISCLOSURE OF THE INVENTION

The present invention has been devised in order to solve such problems. It is therefore an object of the present invention to provide a holographic recording medium which can compensate for shrinkage of a recording layer due to recording or variations in temperature, thereby allowing for reproduction of holograms under optimum conditions, and a method for recording and reproducing the same, and a reading and reproducing apparatus.

As a result of intensive studies, the inventor of the present invention has found a holographic recording medium which can compensate for shrinkage of a recording layer due to recording or variations in temperature, thereby allowing for reproduction of holograms under optimum conditions and a method for recording and reproducing the same, and a recording and reproducing apparatus.

In summary, the above-described objectives are achieved by the following embodiments of the present invention.

(1) A holographic recording medium comprising: a recording layer on which information can be recorded as a hologram; and heat generating layers provided in a pair so as to sandwich the recording layer, wherein these heat generating layers are allowed to generate heat by being irradiated with a heat generating laser beam having a wavelength different from a wavelength of a reproducing laser beam or a recording laser beam for reproducing or recording the information.

(2) The holographic recording medium according to (1), wherein the pair of heat generating layers is formed of a material having a light absorption coefficient for the wavelength of the heat generating laser beam, the light absorption coefficient being higher than light absorption coefficients for the wavelengths of the reproducing laser beam and the recording laser beam.

(3) The holographic recording medium according to (1) or (2), wherein amounts of heat generated by the pair of heat generating layers are generally equal to each other.

(4) The holographic recording medium according to any one of (1) to (3), wherein the recording layer is formed of a material having a light absorption coefficient for the wavelength of the heat generating laser beam, the light absorption coefficient being lower than light absorption coefficients for the wavelengths of the reproducing laser beam and the recording laser beam.

(5) A holographic recording and reproducing method for recording information on the holographic recording medium according to any one of (1) to (4) using a recording laser beam of a signal beam and a reference beam which are obtained by splitting a laser beam source, and for reproducing the recorded information by irradiating the holographic recording medium with a reproducing laser beam under the same irradiation condition as that of one of the signal beam and the reference beam, wherein the heat generating layer is irradiated with the heat generating laser beam to reproduce the information recorded in the recording layer.

(6) The holographic recording and reproducing method according to (5), wherein an intensity of the heat generating laser beam is adjusted in accordance with an intensity of a diffracted beam from the hologram irradiated with the reproducing laser beam.

(7) The holographic recording and reproducing method according to (5), wherein based on an intensity of a diffracted beam from the hologram irradiated with the reproducing laser beam, a position of a lens for condensing the heat generating laser beam on the heat generating layer is moved to adjust a focal position of the heat generating laser beam.

(8) The holographic recording and reproducing method according to any one of (5) to (7), wherein the wavelength of the reproducing laser beam is set to be longer than the wavelength of the recording laser beam.

(9) The holographic recording and reproducing method according to any one of (5) to (8), wherein the information is recorded at an ambient temperature lower than an ambient temperature during reproducing.

(10) The holographic recording and reproducing method according to (9), wherein the ambient temperature during recording is set such that a coefficient of volumetric shrinkage of the holographic recording medium due to recording shrinkage is generally equal to a coefficient of volumetric expansion of the holographic recording medium when the holographic recording medium at the ambient temperature during recording is placed at the ambient temperature during reproducing.

(11) A holographic recording and reproducing apparatus capable of recording information on the holographic recording medium according to any one of (1) to (4) using a recording laser beam of a signal beam and a reference beam which are obtained by splitting a laser beam source, and of reproducing the recorded information by irradiating the holographic recording medium with a reproducing laser beam under the same irradiation condition as that of one of the signal beam and the reference beam, wherein the holographic recording and reproducing apparatus includes a heat generation optical system capable of irradiating the heat generating layer with the heat generating laser beam to reproduce the information recorded in the recording layer.

(12) The holographic recording and reproducing apparatus according to (11), wherein the heat generation optical system is capable of adjusting an intensity of the heat generating laser beam based on an intensity of a diffracted beam from the hologram irradiated with the reproducing laser beam.

(13) The holographic recording and reproducing apparatus according to (11), wherein the heat generation optical system is configured such that, based on an intensity of a diffracted beam from the hologram irradiated with the reproducing laser beam, a position of a lens for condensing the heat generating laser beam on the heat generating layer can be moved to adjust a focal position of the heat generating laser beam.

(14) The holographic recording and reproducing apparatus according to any one of (11) to (13), wherein a wavelength of the reproducing laser beam is set to be longer than a wavelength of the recording laser beam.

BEST MODE FOR CARRYING OUT THE INVENTION

A holographic recording medium according to the present invention has a recording layer on which information can be recorded as a hologram, and a pair of heat generating layers provided so as to sandwich the recording layer. These heat generating layers are allowed to generate heat by being irradiated with a heat generating laser beam having a wavelength different from that of a reproducing laser beam or a recording laser beam for recording or reproducing the information, thereby solving the aforementioned problems.

Now, with reference to the drawings, a description will be made to a holographic recording medium and a method for recording and reproducing the same, and a recording and reproducing apparatus according to first and second embodiments of the present invention.

First Embodiment

To begin with, with reference to FIG. 1, a description will be made to a holographic recording medium 10 according to the first embodiment of the present invention.

As illustrated, the holographic recording medium 10 according to the first embodiment is configured to have a recording layer 12 on which information can be recorded as a hologram; a first heat generating layer 14A and a second heat generating layer 14B provided in a pair so as to sandwich the recording layer 12; and two substrates 16 provided in a pair so as to sandwich the recording layer 12 and the first and second heat generating layers 14A and 14B.

Figure 1:
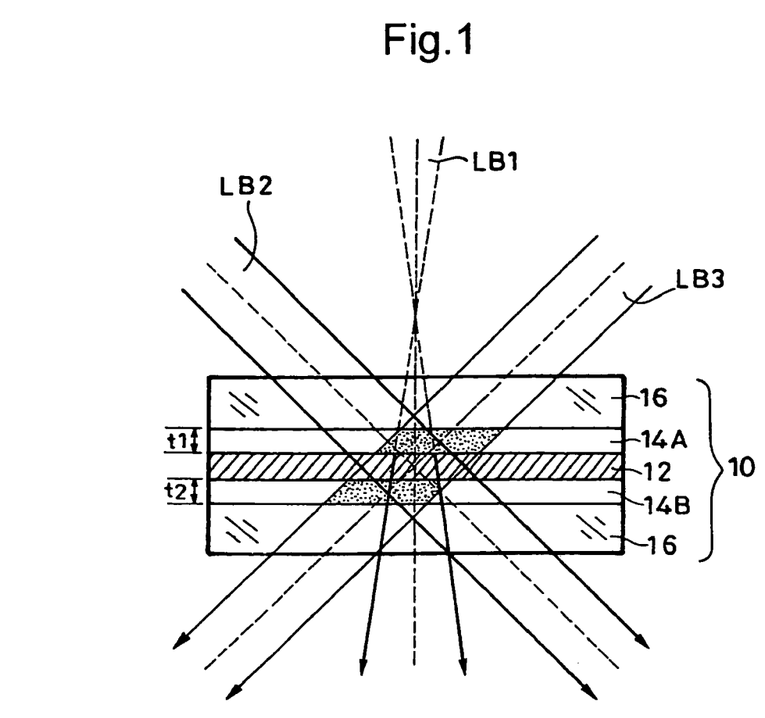
FIG. 1 is a schematic side view illustrating a holographic recording medium according to a first embodiment of the present invention, the medium being irradiated with a signal beam, a reference beam, and a heat generating laser beam.

Note that FIG. 1 illustrates the holographic recording medium 10 being irradiated with a signal beam LB1 and a reference beam LB2, which have a wavelength of $\lambda w$ and are used as a reproducing laser beam or a recording laser beam, and with a heat generating laser beam LB3 having a wavelength of $\lambda h$ that is different from the wavelength of those beams.

Figure 2:
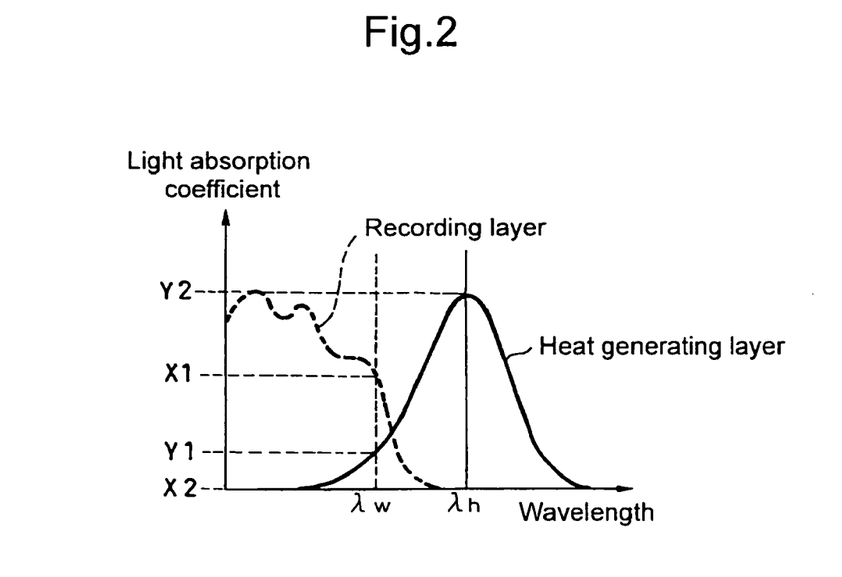
FIG. 2 is a graph schematically showing the light absorption coefficients of a recording layer and a heat generating layer in the holographic recording medium.

As shown in FIG. 2, the recording layer 12 is formed of a material having a light absorption coefficient of X2 for the wavelength $\lambda h$ of the heat generating laser beam LB3 which is lower than a light absorption coefficient of X1 for the wavelength $\lambda w$ of the signal beam LB1 and the reference beam LB2. In contrast to this, the first and second heat generating layers 14A and 14B are formed of a material having a light absorption coefficient of Y2 for the wavelength $\lambda h$ of the heat generating laser beam LB3 which is higher than a light absorption coefficient of Y1 for the wavelength $\lambda w$ of the signal beam LB1 and the reference beam LB2. Accordingly, for example, if the signal beam LB1 and the reference beam LB2 are within the blue wavelength band, the first and second heat generating layers 14A and 14B can be formed of a material having a higher light absorption coefficient for beams in the green to red wavelength bands.

Referring back to FIG. 1, the first and second heat generating layers 14A and 14B are capable of generating heat by being irradiated with the heat generating laser beam LB3, so that the first and second heat generating layers 14A and 14B are designed to generate an approximately equal amount of heat.

More specifically, the thickness t1 of the first heat generating layer 14A and the thickness t2 of the second heat generating layer 14B are designed to satisfy the relation of $t2=t1/(1-\alpha \times t1)(1-AR)$. In the equation above, "$\alpha$" represents the light absorption coefficient of the first and second heat generating layers 14A and 14B, and "AR" represents the light absorption factor of the recording layer 12 for the heat generating laser beam LB3. This equation representing the relationship between the thickness t1 of the first heat generating layer 14A and the thickness t2 of the second heat generating layer 14B can be derived as follows.

Suppose that the heat generating laser beam LB3 transmits from above the holographic recording medium 10 through the first heat generating layer 14A, the recording layer 12, and the second heat generating layer 14B in that order. Assume that P is the laser output power of the heat generating laser beam LB3, and that A1 is the light absorption factor of the first heat generating layer 14A and A2 is the light absorption factor of the second heat generating layer 14B for the heat generating laser beam LB3. In this case, the amount of light absorption by the first heat generating layer 14A is expressed by P×A1, the amount of light absorption by the recording layer 12 is expressed by P×(1−A1)×AR, and the amount of light absorption by the second heat generating layer 14B is expressed by P×(1−A1)(1−AR)×A2.

Accordingly, to equalize the amounts of heat generated (or the amount of light absorption) by the respective first and second heat generating layers 14A and 14B, it should be clearly such that P×(1−A1)(1−AR)×A2=P×A1, i.e., A2=A1/(1−A1)(1−AR).

On the other hand, in the case of the first and second heat generating layers 14A and 14B being formed of the same material, the relationship between the light absorption factor A1 of the first heat generating layer 14A and the light absorption factor A2 of the second heat generating layer 14B can be considered in terms of the relationship between the thicknesses t1 and t2. Thus, by defining α as the light absorption coefficient of the material used to form the first and second heat generating layers 14A and 14B and replacing the light absorption factors A1 and A2 of the first and second heat generating layers 14A and 14B with α×t1 and (α×t2, respectively, the aforementioned equation representing the relation of t2=t1/(1−α×t1)(1−AR) can be derived.

The holographic recording medium 10 according to the first embodiment is configured to have the recording layer 12 on which information can be recorded as holograms; and the first and second heat generating layers 14A and 14B provided in a pair so as to sandwich the recording layer 12. These first and second heat generating layers 14A and 14B are allowed to generate heat by being irradiated with the heat generating laser beam LB3 having a wavelength different from that of the signal beam LB1 or the reference beam LB2 (the reproducing laser beam or the recording laser beam) for readout or recording of information. It is therefore possible to thermally expand the recording layer 12 using the heat of the first and second heat generating layers 14A and 14B, and thereby compensate for shrinkage of the recording layer 12 due to recording or variations in temperature, thus allowing for reproduction of the holograms under optimum conditions.

Furthermore, the first and second heat generating layers 14A and 14B are formed of a material having the light absorption coefficient Y2 for the wavelength λh of the heat generating laser beam LB3 which is higher than the light absorption coefficient Y1 for the wavelength λw of the signal beam LB1 and the reference beam LB2. It is therefore possible to reduce heat generated by the first and second heat generating layers 14A and 14B when irradiated with the signal beam LB1 and the reference beam LB2, thereby allowing for accurately adjusting the amount of heat generated by the heat generating laser beam LB3 in the first and second heat generating layers 14A and 14B.

Furthermore, the recording layer 12 is formed of a material having the light absorption coefficient X2 for the wavelength λh of the heat generating laser beam LB3 which is lower than the light absorption coefficient X1 for the wavelength λw of the signal beam LB1 and the reference beam LB2. It is therefore possible to prevent the recording layer 12 from being photosensitive to the heat generating laser beam LB3 when irradiated therewith, thereby allowing for preventing the occurrence of noise or the like in the recording layer 12.

Furthermore, since the amounts of heat generated by the respective first and second heat generating layers 14A and 14B are generally equal to each other, it is therefore possible to provide a uniform temperature distribution in the recording layer 12 and enhance the diffraction efficiency of the recording layer 12.

Figure 3:
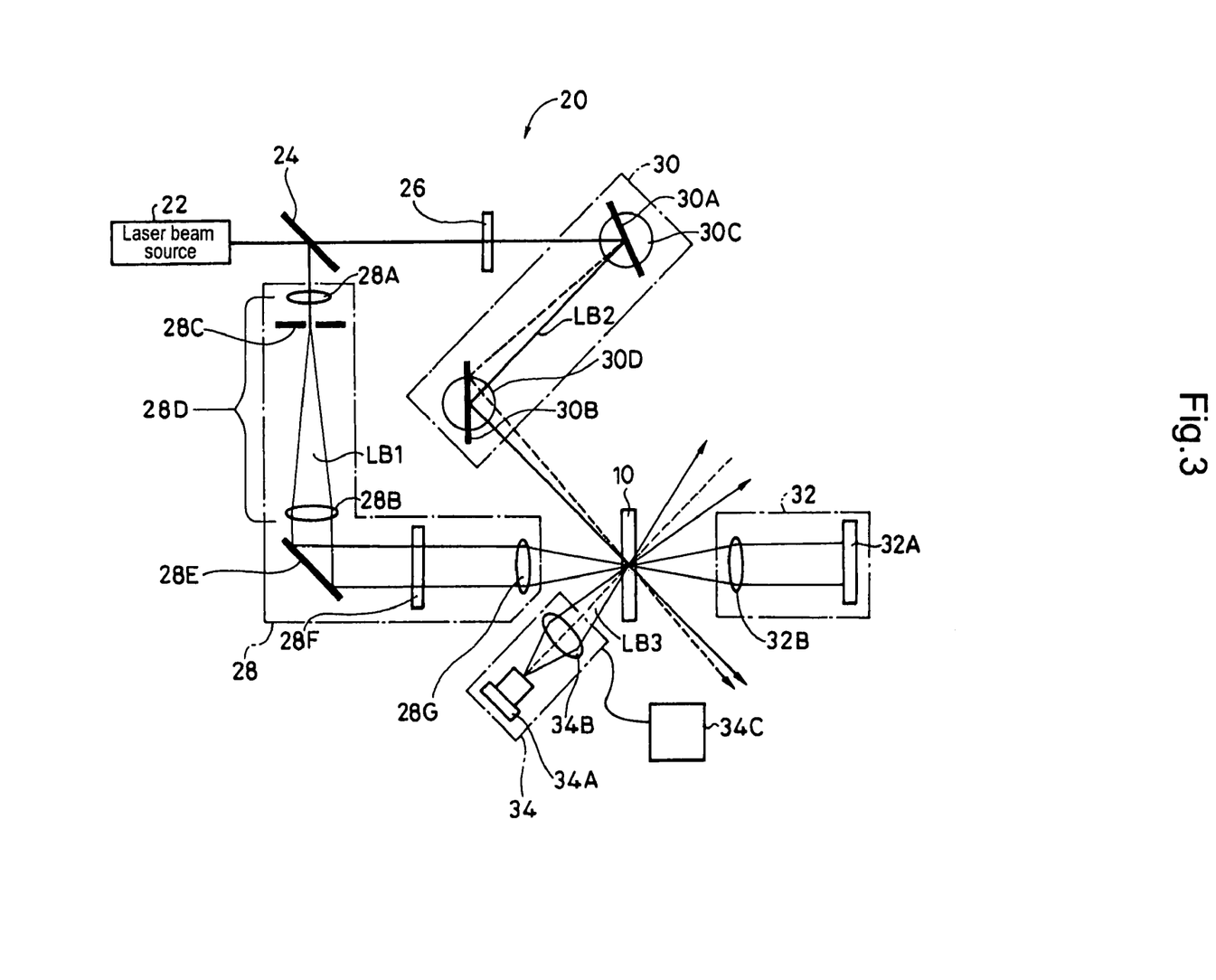
FIG. 3 is an optical system diagram of a holographic recording and reproducing apparatus according to the first embodiment of the present invention.

Now, referring to a holographic recording and reproducing apparatus as shown in FIG. 3, an explanation is made to a method for recording and reproducing information recorded on the holographic recording medium 10.

As illustrated, a holographic recording and reproducing apparatus 20 is configured to include: a laser beam source 22; a polarizing beam splitter 24 for transmitting either one of linearly-polarized beams of laser light from this laser beam source 22 which have orthogonal planes of vibration, such as a p-polarized component, and reflecting an s-polarized component; a signal optical system 28 for introducing the s-polarized signal beam LB1 reflected from the polarization beam splitter 24 to the holographic recording medium 10; a reference optical system 30 for introducing a reference beam LB2 to the holographic recording medium 10, the reference beam LB2 having been transmitted through the polarization beam splitter 24 as the p-polarization component and thereafter s-polarized by its polarization plane being rotated by about 90 degrees on a half-wave plate 26; a detecting optical system 32 for detecting a diffracted beam produced when the holographic recording medium 10 is irradiated with the reference beam (reproducing laser beam) LB2; and a heat generation optical system 34 for irradiating the first and second heat generating layers 14A and 14B of the holographic recording medium 10 with the heat generating laser beam LB3.

The signal optical system 28 is configured to include: a beam expander 28D for expanding the beam diameter of the signal beam emitted from the laser beam source 22, the beam expander 28d consisting of two first and second lenses 28A and 28B and a pin hole 28C; a mirror 28E for reflecting the signal beam LB1, which has passed through the beam expander 28D, at a right angle; a spatial light modulator (hereinafter referred to as the SLM) 28F on which the signal beam LB1 reflected from the mirror 28E is incident; and a Fourier lens 28G for condensing the signal beam LB1 having passed through this SLM 28F into the holographic recording medium 10. Note that the beam expander 28D serves as a relay optical system with the first and second lenses 28A and 28B spaced apart from each other by a distance approximately equal to the sum of their respective focal lengths, while also serving as a spatial filter with the pin hole 28C disposed near the confocal point of the relay optical system.

The reference optical system 30 is configured to include two rotating mirrors 30A and 30B for reflecting the reference beam LB2 incident from the half-wave plate 26 towards the holographic recording medium 10. Note that the rotating mirrors 30A and 30B are supported for their angle of reflection to be adjustable by rotating stages 30C and 30D, thereby allowing the reference optical system 30 to modulate the incidence angle of the reference beam LB2 on the holographic recording medium 10. That is, it is possible to perform angularly multiplexed recording.

The detecting optical system 32 is configured to include a two-dimensional detector 32A; and a focusing lens 32B interposed between the two-dimensional-detector 32A and the holographic recording medium 10.

The heat generation optical system 34 is configured to include: a heat generating laser beam source 34A serving as a light source of the heat generating laser beam LB3; a lens 34B for condensing the heat generating laser beam LB3 emitted from the heat generating laser beam source 34A onto the heat generating layers 14A and 14B of the holographic recording medium 10; and a temperature controller 34C for controlling the heat generating laser beam source 34A and the lens 34B.

The signal beam LB1 incident upon the signal optical system 28 of the holographic recording and reproducing apparatus 20 is increased in its beam diameter by the beam expander 28D, and thereafter reflected by the mirror 28E to be provided with data in the form of intensity modulation at the SLM 28F. The signal beam LB1 is then condensed and its intensity distribution is Fourier transformed through the Fourier lens 28G, then irradiating the holographic recording medium 10.

On the other hand, the reference beam LB2 incident upon the reference optical system 30 is reflected by the two rotating mirrors 30A and 30B at given angles, and thereafter, intersects the signal beam LB1 irradiating the holographic recording medium 10 therein.

Figure 4:
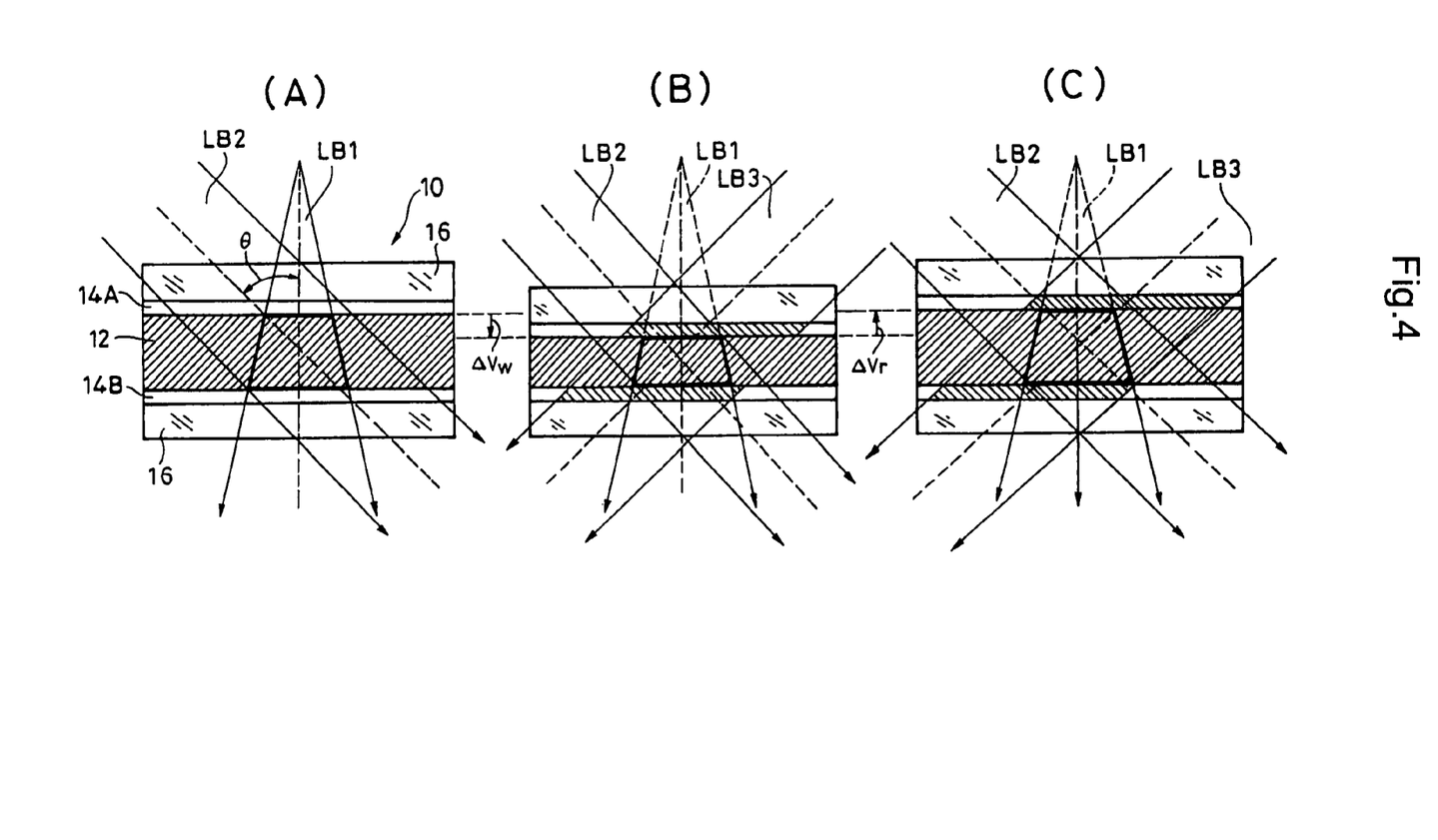
FIG. 4 is a schematic side view illustrating the holographic recording medium according to the first embodiment of the present invention, the medium shrinking due to recording and expanded by heating.

Then, as shown in FIG. 4(A), these signal beam LB1 and reference beam LB2 cause optical interference within a region where the beams intersect each other, and the optical interference serves as a grating to be recorded on the recording layer 12 of the holographic recording medium 10. Note that when angularly multiplexed recording of holograms is performed in the same recoding region, the incidence angle θ of the reference beam LB2 is changed at given angular intervals, thereby performing multiplexed recording of a required number of pages of holograms.

Figure 5:
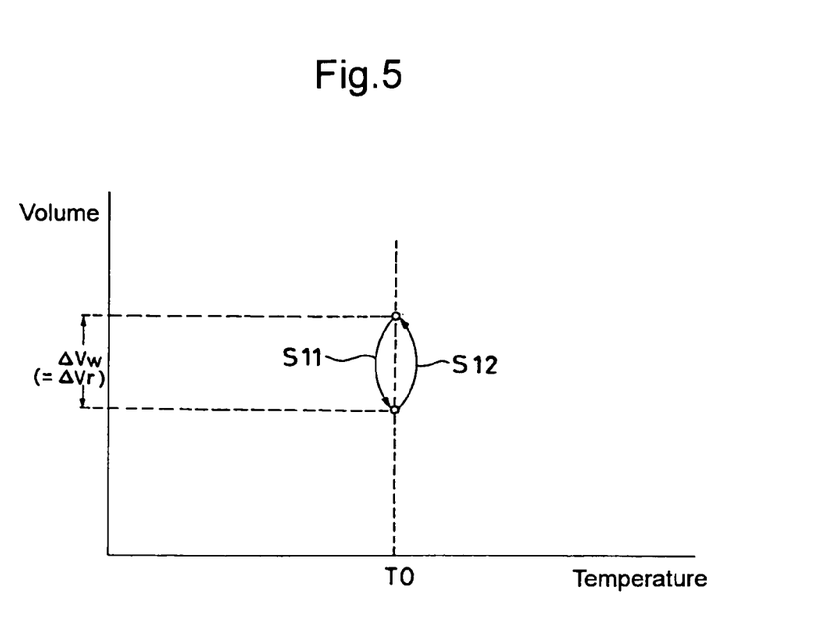
FIG. 5 is a graph showing changes in the state of the holographic recording medium.

At this time, in the recording layer 12 of the holographic recording medium 10 being irradiated with the signal beam LB1 and the reference beam LB2 as shown in FIG. 4(B), the volume of the recording layer 12 is shrunk by $\Delta V_w$ due to recording (S11 of FIG. 5).

In the holographic recording and reproducing apparatus 20 according to the first embodiment, the first and second heat generating layers 14A and 14B are irradiated with the heat generating laser beam LB3 in order to compensate for shrinkage of the recording layer 12 due to recording. As a result, the first and second heat generating layers 14A and 14B having absorbed the heat generating laser beam LB3 generate heat, causing the volume of the recording layer 12 to be thermally expanded by $\Delta V_r$ as shown in FIG. 4(C) (S12 of FIG. 5).

Note that the thermal shrinkage percentage of photopolymer typically employed as the material of the recording layer 12 is about 0.1% to 0.5%, and epoxy-based resin has a coefficient of linear expansion of 5 to $10 \times 10^{-5}/°$ C. The temperature control of the first and second heat generating layers 14A and 14B using the heat generating laser LB3 is thus provided within a temperature range of about 10° C. (for a recording shrinkage percentage of 0.1% and a coefficient of linear expansion of $10 \times 10^{-5}/°$ C.) to 100° C. (for a recording shrinkage percentage of 0.5% and a coefficient of linear expansion of $5 \times 10^{-5}/°$ C.).

Then, the recording layer 12 that has been thermally expanded is irradiated with the reference beam LB2. The reference beam LB2 is diffracted by a hologram formed in the recording layer 12 and then transmitted towards the focusing lens 32B as a diffracted beam in the same direction as the signal beam LB1 during recording. The diffracted beam is received by an imaging device 32A via the focusing lens 32B, thereby providing a complex reproduced image and thus reproduced information.

Figure 6:
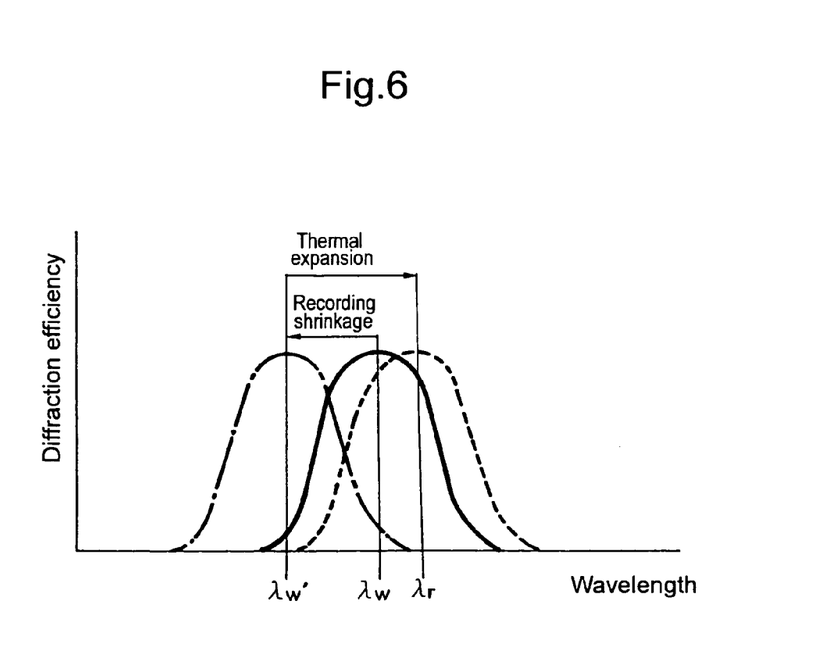
FIG. 6 is a graph showing the relationship between the wavelength and the diffraction efficiency during recording and reproducing the holographic recording medium.

Note that since the cycle of gratings recorded on the recording layer 12 becomes shorter (varied) due to the aforementioned recording shrinkage, the wavelength λw', which indicates the maximum diffraction efficiency in the hologram recording medium 10 after recording, becomes shorter than the wavelength λw of the recording laser beam as shown in FIG. 6. Accordingly, the wavelength λr of the reproducing laser beam is preferably set to be longer than the wavelength λw of the recording laser beam. In this case, the recording layer 12 can be thermally expanded to thereby make the wavelength λw' of the hologram recording medium 10 closer to the wavelength λr of the reproducing laser beam, thus allowing the hologram diffraction efficiency to be maximized.

More specifically, the wavelength λr of the reproducing laser beam may be set at $λw'+\Delta\lambda_1/2$ or greater (where $\Delta\lambda_1$ is a wavelength error of the recording laser beam in the recording apparatus). Alternatively, when a wavelength error of $\Delta\lambda_2$ of the reproducing laser beam in the reproducing apparatus is taken into account, the wavelength λr of the reproducing laser beam is preferably set at $λw'+(\Delta\lambda_1+\Delta\lambda_2)/2$ or greater. Note that the reproducing laser beam and the recording laser beam may be provided by the same light source as in the first embodiment or by separate light sources.

On the other hand, the imaging device 32A, which is capable of providing complex reproduced images as well as detecting the total amount of light of reproduced images, sends data on the total amount of light detected by the imaging device 32A to the temperature controller 34C of the heat generation optical system 34. Then, when the total amount of light of reproduced images is below a specified threshold value, i.e., no reproduced information is available, the temperature controller 34C adjusts the intensity of the heat generating laser beam LB3 to provide optimal control such that the total amount of light of reproduced images becomes greater than the specified threshold value.

According to the holographic recording and reproducing method of the first embodiment, to reproduce information recorded on the recording layer 12, the first and second heat generating layers 14A and 14B are irradiated with the heat generating laser beam LB3, thereby thermally expanding the recording layer 12. It is thus possible to compensate for the shrinkage of the recording layer 12 caused by recording or variations in temperature, thereby allowing for reproduction of holograms under optimum conditions.

In particular, the intensity of the heat generating laser beam LB3 is to be adjusted based on the intensity of a diffracted beam from a hologram when irradiated with the reference beam (reproducing laser beam) LB2, thereby making it possible to read out the hologram under further optimized conditions.

Note that a holographic recording and reproducing method according to the present invention is not limited to the holographic recording and reproducing method according to the first embodiment. For example, the reference beam LB2 may be first used for irradiation, and then the heat generating laser beam LB3 may be used for irradiation only when no reproduced information is available. Alternatively, the reference beam LB2 and the heat generating laser beam LB3 may also be used generally at the same time for irradiation.

The holographic recording medium can typically store several hundreds to several thousands of holograms superimposed in the same recording region by angularly multiplexed recording, and those imaging devices currently prevailing have a frame rate of about a few tens of frames per second. Thus, it requires a few tens of seconds to reproduce holograms in the same recording region on the holographic recording medium.

On the other hand, in the field of optical discs, temperature control can be provided at a rate of about $10^{10°}$ C./sec using a laser beam condensed to about 1 μm, and thus even a laser beam having a spot of about 1 mm employed for a holographic recording medium is thought to be capable of providing temperature control at a rate of about $10^{4°}$ C./sec. Accordingly, even when temperature control is provided to the first and second heat generating layers 14A and 14B, e.g., within the range of 0 to 100° C., duration of about 10 milliseconds is expected to be sufficient enough to raise the first and second heat generating layers 14A and 14B to a desired temperature.

That is, the minimum time required to reproduce a hologram is about a few tens of seconds, while temperature control of the first and second heat generating layers 14A and 14B can be provided in about 10 milliseconds. Thus, even when irradiated generally at the same time with the reference beam LB2 and the heat generating laser beam LB3, the hologram is thought to be reproduced with the recording layer 12 being sufficiently expanded by heating.

Furthermore, in the aforementioned first embodiment, the intensity of the heat generating laser beam LB3 is to be adjusted based on the intensity of a diffracted beam from a hologram when irradiated with the reference beam LB2; however, the present invention is not limited thereto. For example, based on the intensity of a diffracted beam from a hologram irradiated with the reproducing laser beam LB1, the position of the lens 34B for condensing the heat generating laser beam LB3 onto the first and second heat generating layers 14A and 14B may be moved so as to adjust the focal position of the heat generating laser beam LB3, thereby providing the same effects.

Second Embodiment

Figure 7:
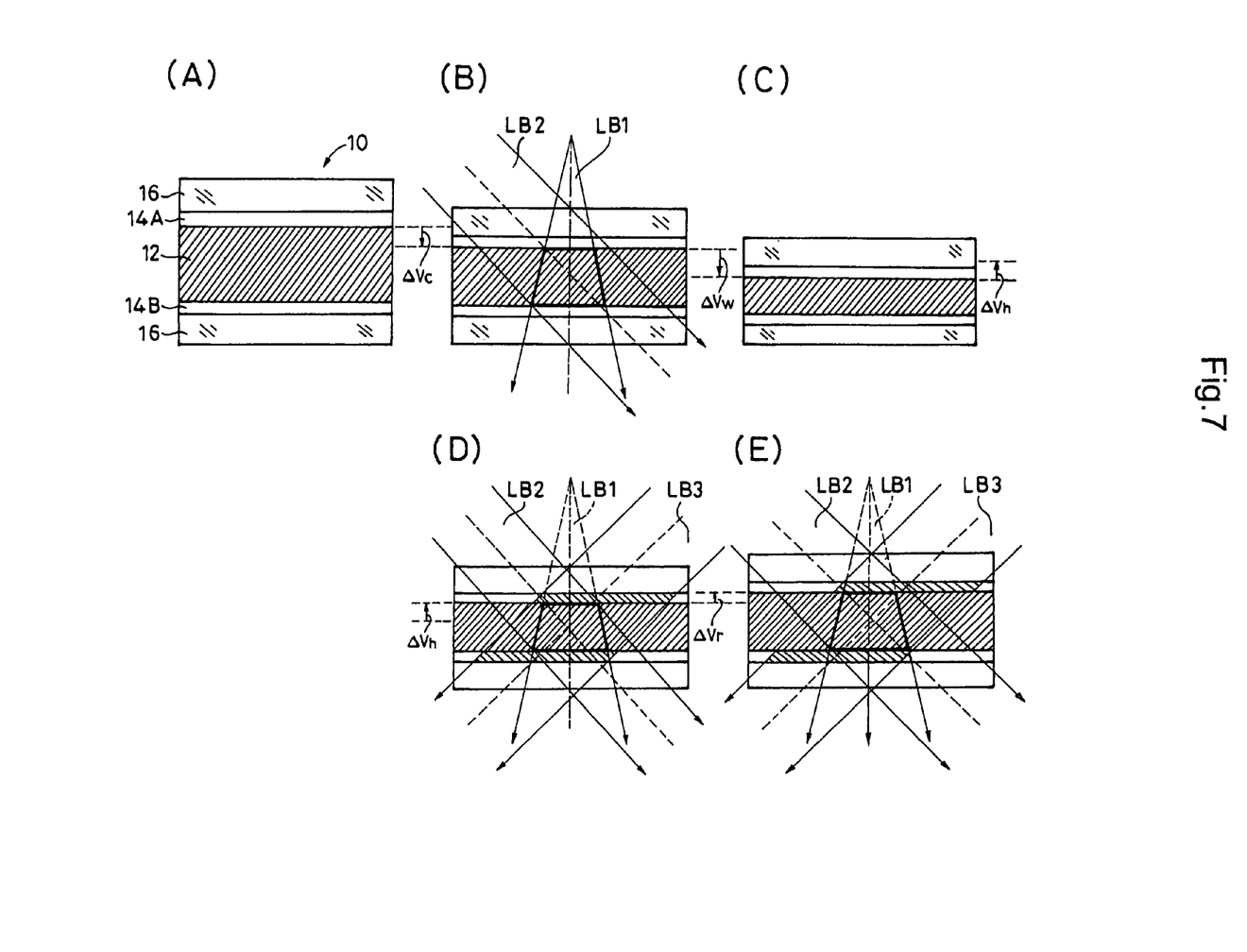
FIG. 7 is a schematic side view illustrating a holographic recording medium shrinking due to recording and expanded by heating in accordance with a holographic recording and reproducing method according to a second embodiment of the present invention.
Figure 8:
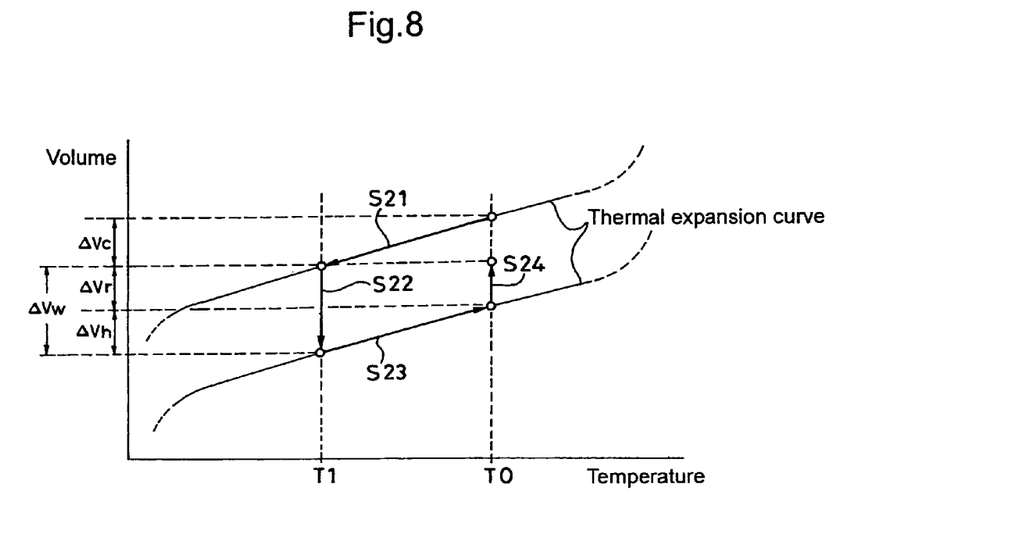
FIG. 8 is a graph showing changes in the state of the holographic recording medium.

Now, with reference to FIGS. 7 and 8, an explanation is made to a holographic recording and reproducing method according to a second embodiment of the present invention.

The holographic recording and reproducing method according to the second embodiment is analogous to the aforementioned holographic recording and reproducing method according to the first embodiment in terms of the recording and reproducing principles thereof, but is different therefrom in that an ambient temperature T1 during recording is set to be lower than an ambient temperature T0 during reproducing.

In the holographic recording and reproducing method according to the second embodiment, the holographic recording medium 10 at the ambient temperature T0 is first placed at the ambient temperature T1 to be cooled down so that the volume of the recording layer 12 is shrunk by $\Delta Vc$ as shown in FIG. 7(B) (S21 of FIG. 8). Then, recording is performed on the holographic recording medium 10, which has been shrunk by cooling, according to the aforementioned recording method, so that the volume of the recording layer 12 is further shrunk by $\Delta Vw$ due to the recording as shown in FIG. 7(C) (S22 of FIG. 8).

The holographic recording medium 10 on which recording has been performed is placed at the ambient temperature T0 that is higher than the ambient temperature T1 during recording, so that the volume of the recording layer 12 is thermally expanded by $\Delta Vh$ as shown in FIG. 7(D) (S23 of FIG. 8). Then, as shown in FIG. 7(E), the aforementioned reproducing method allows the volume of the recording layer 12 to be thermally expanded by $\Delta Vr$ (S24 of FIG. 8) and holograms to be reproduced.

According to the holographic recording and reproducing method of the second embodiment, information is recorded at the ambient temperature T1 lower than the ambient temperature T0 during reproducing. Accordingly, when compared with the holographic recording and reproducing method according to the first embodiment described above, the volume of the recording layer 12 during reproducing can be made closer to the volume that has not yet been shrunk due to the recording. It is thus possible to compensate more easily for the recording shrinkage of the holographic recording medium 10.

Figure 9:
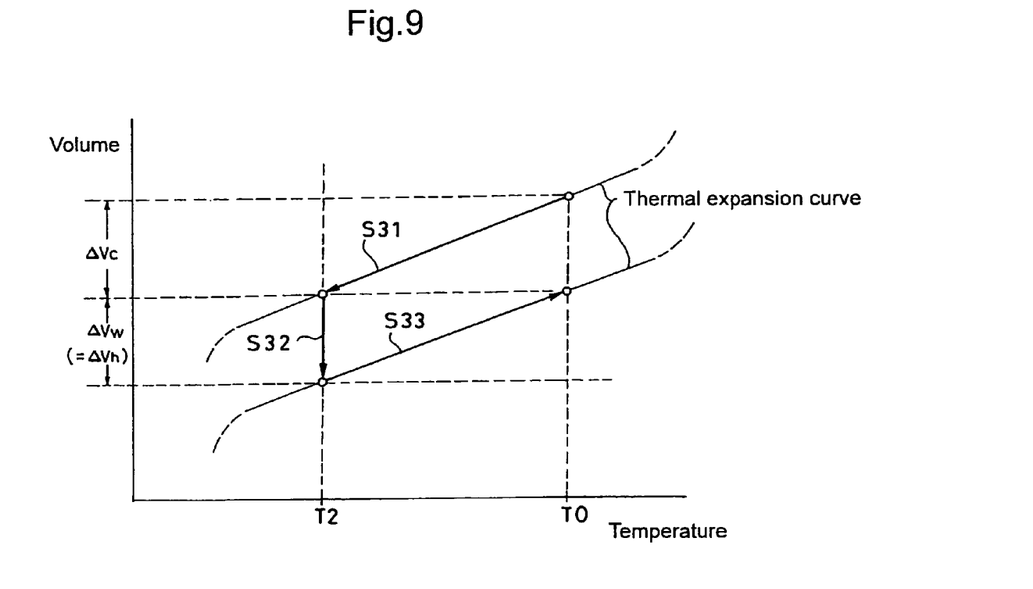
FIG. 9 is a graph showing other changes in the state of the holographic recording medium.

Note that as shown in FIG. 9, an ambient temperature T2 during recording may be set such that a coefficient of volumetric shrinkage $\Delta Vw$ of the holographic recording medium 10 due to recording shrinkage (S32 of FIG. 9) is generally equal to a coefficient of volumetric expansion $\Delta Vh$ of the holographic recording medium 10 when the holographic recording medium 10 at the ambient temperature T2 during recording is placed at the ambient temperature T0 during reproducing (S33 of FIG. 9). In this case, the volume of the recording layer 12 during reproducing can be made generally equal to the volume that has not yet been shrunk due to the recording, thus further facilitating the compensation for shrinkage due to recording.

INDUSTRIAL APPLICABILITY

According to the holographic recording medium and the method for recording and reproducing the same, and the recording and reproducing apparatus in accordance with the present invention, it is possible to compensate for shrinkage of the recording layer due to recording or variations in temperature, thereby allowing for reproduction of holograms under optimum conditions.

The invention claimed is:

1. A holographic recording medium comprising:
   a recording layer on which information can be recorded as a hologram; and
   heat generating layers provided in a pair so as to sandwich the recording layer, wherein
   these heat generating layers are allowed to generate heat by being irradiated with a heat generating laser beam having a wavelength different from a wavelength of a reproducing laser beam or a recording laser beam for reproducing or recording the information.

2. The holographic recording medium according to claim 1, wherein
   the pair of heat generating layers is formed of a material having a light absorption coefficient for the wavelength of the heat generating laser beam, the light absorption coefficient being higher than light absorption coefficients for the wavelengths of the reproducing laser beam and the recording laser beam.

3. The holographic recording medium according to claim 1, wherein
   amounts of heat generated by the pair of heat generating layers are generally equal to each other.

4. The holographic recording medium according to claim 2, wherein
   amounts of heat generated by the pair of heat generating layers are generally equal to each other.

5. The holographic recording medium according to claim 1, wherein
   the recording layer is formed of a material having a light absorption coefficient for the wavelength of the heat generating laser beam, the light absorption coefficient being lower than light absorption coefficients for the wavelengths of the reproducing laser beam and the recording laser beam.

6. The holographic recording medium according to claim 2, wherein
   the recording layer is formed of a material having a light absorption coefficient for the wavelength of the heat generating laser beam, the light absorption coefficient being lower than light absorption coefficients for the wavelengths of the reproducing laser beam and the recording laser beam.

7. The holographic recording medium according to claim 3, wherein
   the recording layer is formed of a material having a light absorption coefficient for the wavelength of the heat generating laser beam, the light absorption coefficient being lower than light absorption coefficients for the wavelengths of the reproducing laser beam and the recording laser beam.

8. The holographic recording medium according to claim 4, wherein
the recording layer is formed of a material having a light absorption coefficient for the wavelength of the heat generating laser beam, the light absorption coefficient being lower than light absorption coefficients for the wavelengths of the reproducing laser beam and the recording laser beam.

9. A holographic recording and reproducing method for recording information on the holographic recording medium according to claim 1 using a recording laser beam of a signal beam and a reference beam which are obtained by splitting a laser beam source, and for reproducing the recorded information by irradiating the holographic recording medium with a reproducing laser beam under the same irradiation condition as that of one of the signal beam and the reference beam, wherein
the heat generating layer is irradiated with the heat generating laser beam to reproduce the information recorded in the recording layer.

10. The holographic recording and reproducing method according to claim 9, wherein
an intensity of the heat generating laser beam is adjusted in accordance with an intensity of a diffracted beam from the hologram irradiated with the reproducing laser beam.

11. The holographic recording and reproducing method according to claim 9, wherein
based on an intensity of a diffracted beam from the hologram irradiated with the reproducing laser beam, a position of a lens for condensing the heat generating laser beam on the heat generating layer is moved to adjust a focal position of the heat generating laser beam.

12. The holographic recording and reproducing method according to claim 9, wherein
the wavelength of the reproducing laser beam is set to be longer than the wavelength of the recording laser beam.

13. The holographic recording and reproducing method according to claim 9, wherein
the information is recorded at an ambient temperature lower than an ambient temperature during reproducing.

14. The holographic recording and reproducing method according to claim 10, wherein
the information is recorded at an ambient temperature lower than an ambient temperature during reproducing.

15. The holographic recording and reproducing method according to claim 13, wherein
the ambient temperature during recording is set such that a coefficient of volumetric shrinkage of the holographic recording medium due to recording shrinkage is generally equal to a coefficient of volumetric expansion of the holographic recording medium when the holographic recording medium at the ambient temperature during recording is placed at the ambient temperature during reproducing.

16. A holographic recording and reproducing apparatus capable of recording information on the holographic recording medium according to claim 1 using a recording laser beam of a signal beam and a reference beam which are obtained by splitting a laser beam source, and of reproducing the recorded information by irradiating the holographic recording medium with a reproducing laser beam under the same irradiation condition as that of one of the signal beam and the reference beam, wherein
the holographic recording and reproducing apparatus includes a heat generation optical system capable of irradiating the heat generating layer with the heat generating laser beam to reproduce the information recorded in the recording layer.

17. The holographic recording and reproducing apparatus according to claim 16, wherein
the heat generation optical system is capable of adjusting an intensity of the heat generating laser beam based on an intensity of a diffracted beam from the hologram irradiated with the reproducing laser beam.

18. The holographic recording and reproducing apparatus according to claim 16, wherein
the heat generation optical system is configured such that, based on an intensity of a diffracted beam from the hologram irradiated with the reproducing laser beam, a position of a lens for condensing the heat generating laser beam on the heat generating layer can be moved to adjust a focal position of the heat generating laser beam.

19. The holographic recording and reproducing apparatus according to claim 16, wherein
a wavelength of the reproducing laser beam is set to be longer than a wavelength of the recording laser beam.

20. The holographic recording and reproducing apparatus according to claim 17, wherein
a wavelength of the reproducing laser beam is set to be longer than a wavelength of the recording laser beam.

* * * * *